April 13, 1965 R. C. BERKER, SR 3,178,620
MEANS FOR SECURING A NON-MAGNETIC WORKPIECE
TO A MAGNETIC CHUCK
Filed Jan. 16, 1961
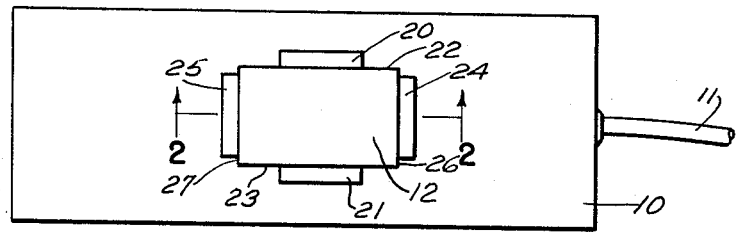
FIG. 1
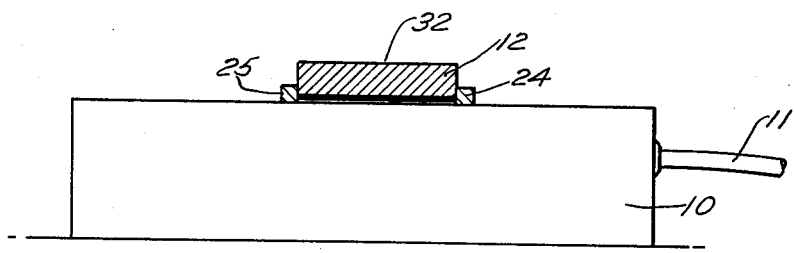
FIG. 2
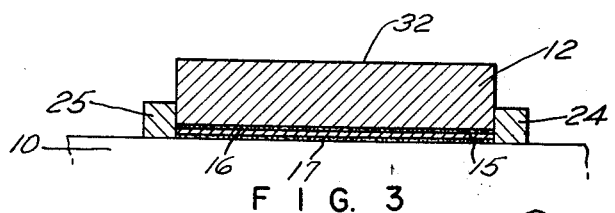
FIG. 3
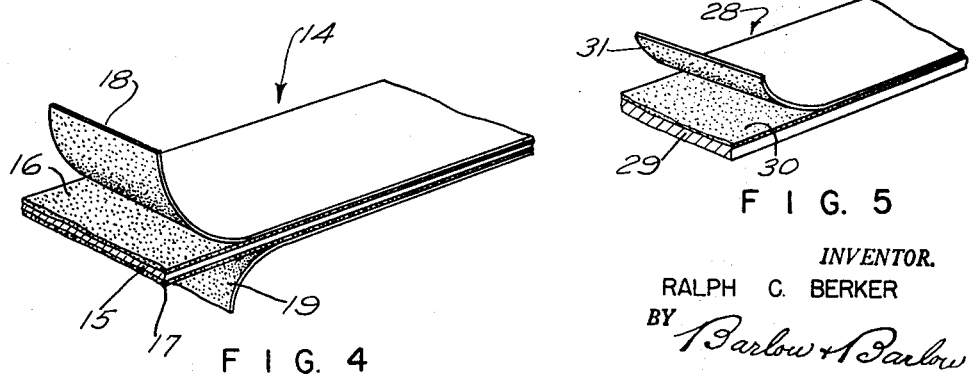
FIG. 4
FIG. 5
INVENTOR.
RALPH C. BERKER
BY Barlow & Barlow
ATTORNEYS

¹

United States Patent Office 3,178,620
Patented Apr. 13, 1965

3,178,620
MEANS FOR SECURING A NON-MAGNETIC WORKPIECE TO A MAGNETIC CHUCK
Ralph C. Berker, Sr., 48 Beachwood Drive, Warwick, R.I.
Filed Jan. 16, 1961, Ser. No. 82,967
6 Claims. (Cl. 317—159)

This invention relates to the securing of a workpiece of some material other than iron and therefore non-magnetic to a magnetic chuck.

Magnetic chucks are largely used in machine operations for holding a workpiece in position and they work well upon iron or steel workpieces which may be attracted by magnetism to the chuck. However, when brass, aluminum, or some other non-magnetic material is operated upon, these chucks are of little or no value or must have some additional equipment for the securing of such a part in position.

One of the objects of this invention is to provide a member by which the non-magnetic workpiece may be secured to the magnetic chuck against lifting of the workpiece upwardly directly away from the chuck while at the same time employing magnetic members which are attracted to the surface of the chuck and by being positioned against the edges of the workpiece prevent lateral movement of the workpiece.

With these and other objects in view, the invention consists of certain novel features of construction, as will be more fully described and particularly pointed out in the appended claims.

In the accompanying drawings:

FIGURE 1 is a top plan view illustrating a magnetic chuck largely diagrammatically with the workpiece in position thereon engaged by magnetic members at its opposite side and end edges;

FIGURE 2 is a sectional view through the workpiece and the members but showing the magnetic chuck in full;

FIGURE 3 is a view similar to FIGURE 2 but on a much larger scale to show the adhesive means for securing the work to the chuck;

FIGURE 4 is a fragmental portion of the adhesive member with a removable covering thereon prior to use; and FIGURE 5 is a perspective view of a modified form of adhesive member.

In proceeding with this invention, I provide some means for adhering the workpiece to the surface of the magnetic chuck which may be by means of a separate sheet member having adhesive on one side to engage the non-magnetic work and either secured by adhesive on the other side or some other means if it is made of magnetic material. I further prevent lateral movement on the chuck by use of magnetic members of a thickness less than the work by engagement to prevent lateral movement in any direction.

With reference to the drawing, 10 designates a magnetic chuck shown somewhat diagrammatically with electrical conduit 11 for energizing the same. The workpiece is designated 12 and is shown conventionally as a rectangular block which is of non-magnetic material, such for instance as brass or aluminum.

In order to hold such a member as 12 upon the chuck 10, I have provided a member 14 which consists of a sheet of thin stock, either plastic or some fabricated material, 15 which has on its upper surface an adhesive 16 of a very tenacious quality, such as may be found on the market at the present time, and also has on its lower surface a similar adhesive material 17. The upper adhesive surface is covered with a wax-like protective sheet of material 18, which may be readily peeled off when the member is to be used, and a similar wax-like covering 19 over its lower surface. To hold the workpiece in place, a member such as 14 will be cut to approximately the size of the under surface of the member 12 and then the upper covering sheet 18 will be stripped from the adhesive surface 16, exposing the same, and the member 14 will be adhered to the workpiece 12 on its under surface. After this is attached, the covering 19 on the lower surface of the member 14 will be stripped from position exposing the adhesive 17, and the workpiece 12 with this adhesive member secured thereon will then be positioned on chuck 10 and will be firmly adhered thereto against lifting vertically from the chuck.

Some additional means is usually desirable for holding the workpiece 12 against lateral movement either endwise or sidewise, and I have provided magnetic members 20 and 21 to engage the side edges 22 and 23 of the workpiece 12 and magnetic members 24 and 25 to engage the ends 26 and 27 of the workpiece 12. These magnetic members 20, 21 and 24, 25 are of a thickness less than the workpiece so that the top surface 32 of the workpiece may be accessible for machining and by reason of the attraction of the magnetic chuck these will be held firmly against the chuck and prevent any lateral movement of the workpiece 12 during machining.

It is conceivable that the adhesive member, designated generally 14, may be modified as shown in FIGURE 5 where the adhesive member is now designated 28 and comprises a thin sheet of iron or steel 29 having an adhesive upper surface 30. The sheet iron material is attractable to the magnetic chuck while the adhesive 30 will engage the workpiece and secure it to the sheet material. In this instance also, the edge engaging members 20, 21, 24 and 25 will likewise be used as heretofore described.

I claim:

1. Securing means for a non-magnetic workpiece comprising a magnetic chuck, a sheet-like member having an adhesive surface engaging the non-magnetic workpiece, means to secure the opposite surface of the member to the magnetic chuck, and magnetic block members held to the surface of the magnetic chuck and positionable at the edges of the workpiece to prevent lateral movement thereof relative to the chuck.

2. Securing means as in claim 1 wherein the sheet like member is non-magnetic and has adhesive on its said opposite surface to secure it to the magnetic chuck.

3. Securing means as in claim 1 wherein the magnetic block members are of a thickness less than the workpiece.

4. The method of holding a non-magnetic workpiece on a magnetic chuck for operations thereon tending to move the workpiece laterally parallel to the surface of the chuck which comprises adhesively securing the workpiece to the chuck to prevent movement away from the chuck and using magnetic members of a thickness less than the workpiece engaging the edges of a workpiece to prevent lateral movement of the workpiece.

5. The method of holding a non-magnetic workpiece on a magnetic chuck for operations thereon tending to move the workpiece laterally parallel to the surface of the chuck comprising providing a member having adhesive opposite surfaces, adhering one surface of the member to the workpiece and the opposite surface of the member to the chuck and additionally positioning magnetically attractable members of a thickness less than the thickness workpiece on the chuck at the edges of the workpiece to be held in place by the magnetism of the chuck and prevent lateral movement of the workpiece on the chuck.

6. Securing means for a non-magnetic workpiece comprising a magnetic chuck, a sheet-like member of magnetically attractable material having an adhesive surface engaging the non-magnetic workpiece and held to the magnetic chuck by the attraction between the chuck and sheet-like member, and magnetic block members held to the surface of the magnetic chuck and positioned at the edges of the workpiece to prevent lateral movement of the workpiece relative to the chuck, said block members being of a thickness less than the thickness of the workpiece.

References Cited in the file of this patent

UNITED STATES PATENTS

| | | |
|---|---|---|
| 2,599,359 | Banks et al. | June 3, 1952 |
| 2,797,370 | Bennett | June 25, 1957 |
| 3,068,790 | Specker | Dec. 18, 1962 |

FOREIGN PATENTS

| | | |
|---|---|---|
| 612,017 | Canada | Jan. 3, 1961 |